US008430542B2

(12) United States Patent
Ku et al.

(10) Patent No.: US 8,430,542 B2
(45) Date of Patent: Apr. 30, 2013

(54) LAMP WITH SNOW REMOVING STRUCTURE

(75) Inventors: Chin-Long Ku, Taipei Hsien (TW); Chin-Wen Yeh, Taipei Hsien (TW); Zhen-Neng Lin, Shenzhen (CN)

(73) Assignees: Fu Zhun Precision Industry (Shen Zhen) Co., Ltd., Shenzhen (CN); Foxconn Technology Co., Ltd., New Taipei (TW)

( * ) Notice: Subject to any disclaimer, the term of this patent is extended or adjusted under 35 U.S.C. 154(b) by 512 days.

(21) Appl. No.: 12/846,842

(22) Filed: Jul. 30, 2010

(65) Prior Publication Data

US 2011/0103083 A1 May 5, 2011

(30) Foreign Application Priority Data

Oct. 29, 2009 (CN) .......................... 2009 1 0309069

(51) Int. Cl.
*B60Q 1/06* (2006.01)

(52) U.S. Cl.
USPC ........................................... 362/428; 362/431

(58) Field of Classification Search .................. 362/119, 362/120, 371, 396, 418, 428, 431
See application file for complete search history.

(56) References Cited

U.S. PATENT DOCUMENTS

2011/0096550 A1* 4/2011 Ku et al. .................. 362/296.01

* cited by examiner

*Primary Examiner* — Vip Patel
(74) *Attorney, Agent, or Firm* — Altis Law Group, Inc.

(57) ABSTRACT

A lamp includes a bracket, a cover and a lamp body pivotably engaged with the shaft. The bracket includes a shaft with a flat top surface. The lamp body includes a first lateral portion and a second lateral portion. The lamp body defines a channel with a flat top surface. The cover is mounted over the second lateral portion. When the lamp body is at a first position, the top surface of the channel engages the top surface of the shaft. When the first lateral portion of the lamp body is subjected to weight of snow/ice accumulated thereon which is beyond a set value, the lamp body rotates around the shaft from the first position to a second position to enable the snow/ice to fall from the first lateral portion.

11 Claims, 7 Drawing Sheets

LAMP WITH SNOW REMOVING STRUCTURE

BACKGROUND

1. Technical Field

The present disclosure relates to a lamp and, more particularly, to a lamp with snow removing structure, whereby snow on a top of the lamp can automatically leave the lamp when the snow is accumulated to a certain amount.

2. Description of Related Art

An outdoor lamp such as a street lamp is widely installed throughout the country due to road safety and security purpose. Conventionally, the street lamp includes a lamp post and a lamp body fastened at a top of the lamp post. A light source with high luminance irradiation is installed in a bottom of the lamp body and provides light to the ground. However, since the lamp body is exposed to ambient air, the lamp body is often covered with snow or ice in snow/snowstorm day. The snow or ice accumulated on the lamp body, if too much, possibly causes a heavy load on the lamp body which may result in a damage to the lamp body or even a break of the lamp body from the lamp post.

What is needed, therefore, is a lamp with snow removing structure to remove snow or ice thereon when the snow or ice accumulated thereon reaches a predetermined amount.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
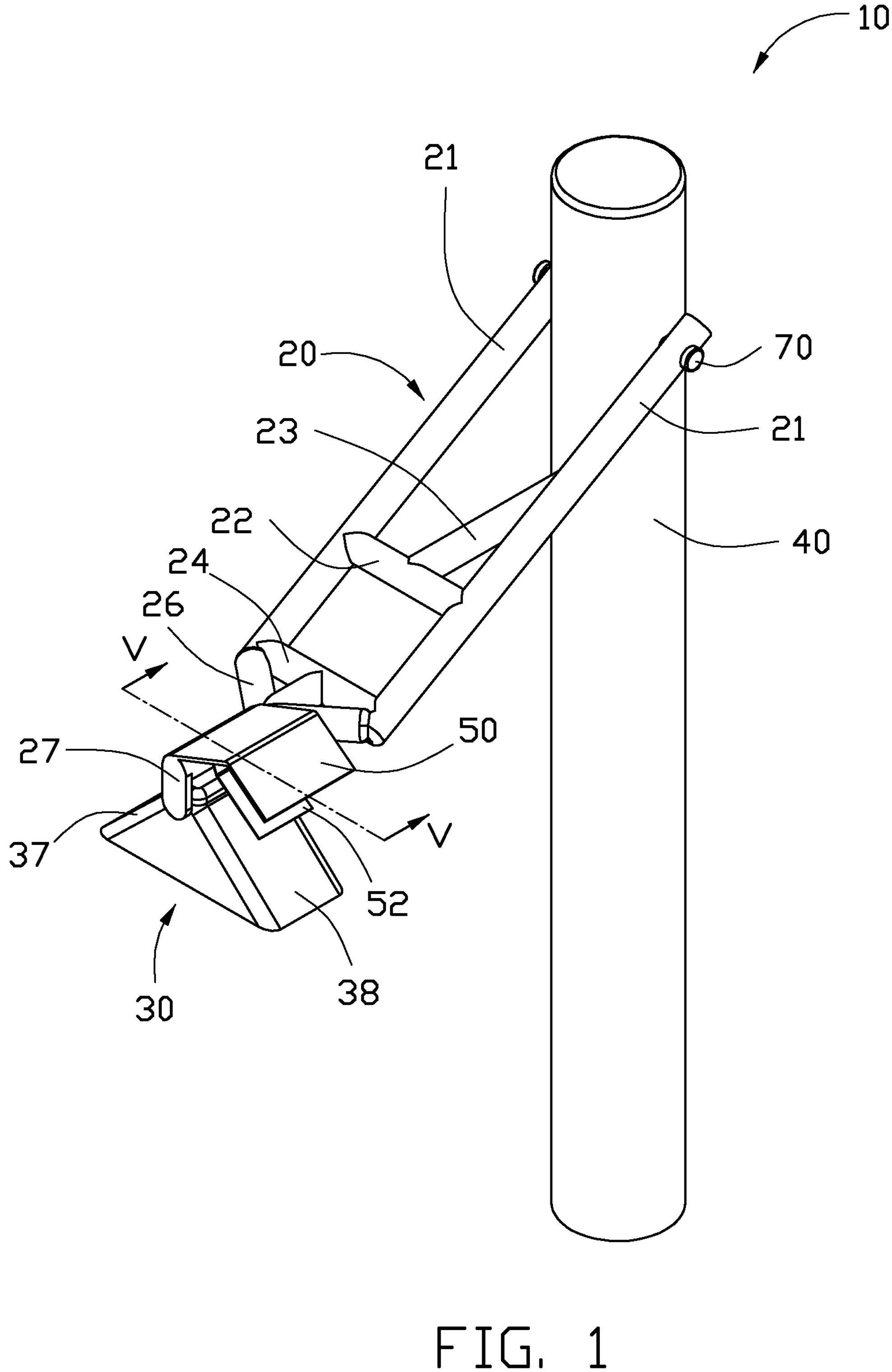
FIG. 1 is an assembled view of a lamp in accordance with an embodiment of the present disclosure.
Figure 2:
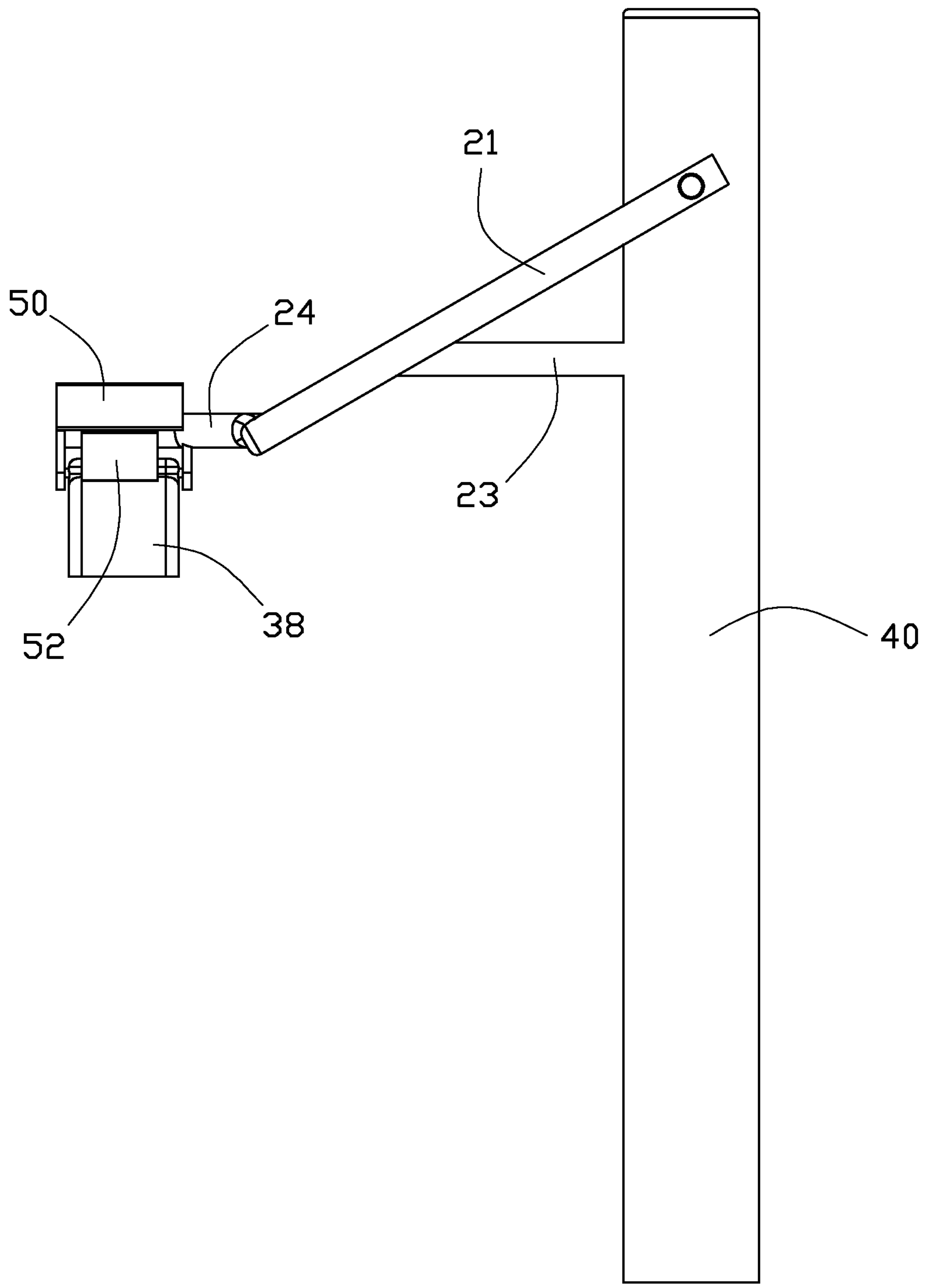
FIG. 2 is a side view of the lamp of FIG. 1.
Figure 3:
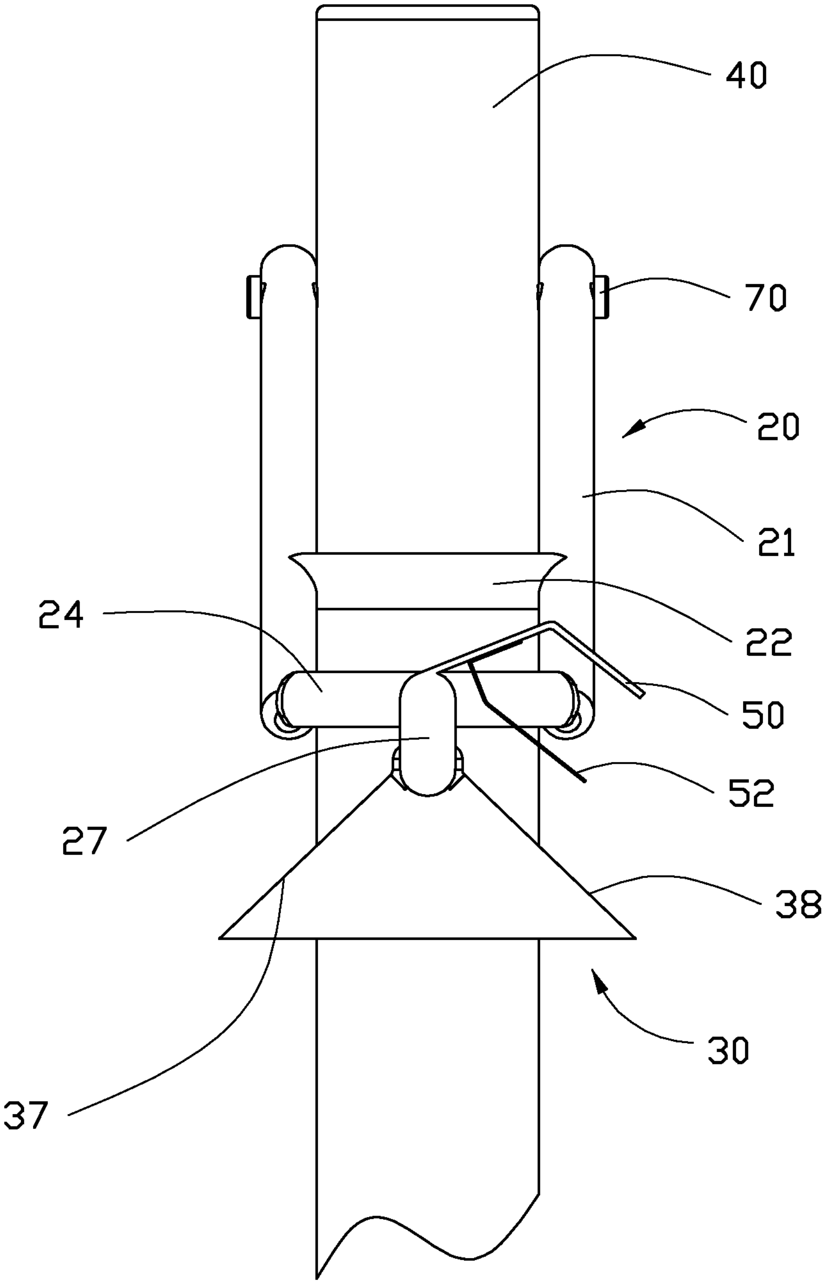
FIG. 3 is a front view of the lamp of FIG. 1.

Referring to FIGS. 1-3, a lamp 10 in accordance with an embodiment of the disclosure is illustrated. The lamp 10 is an outdoor lamp such as a street lamp, a landscape lamp, and so on. The lamp 10 comprises an inclined bracket 20 and a lamp body 30 pivotably engaged with a bottom end of the bracket 20. The lamp 10 further comprises a lamp post 40 to engage a top end of the bracket 20 for supporting the lamp body 30. In another embodiment, the lamp post 40 can be omitted, and the bracket 20 may be installed onto a wall. The bracket 20 includes a cover 50 to limit a rotation of lamp body 30. In this embodiment, the cover 50 is located above a part of a top of the lamp body 30.

Figure 4:
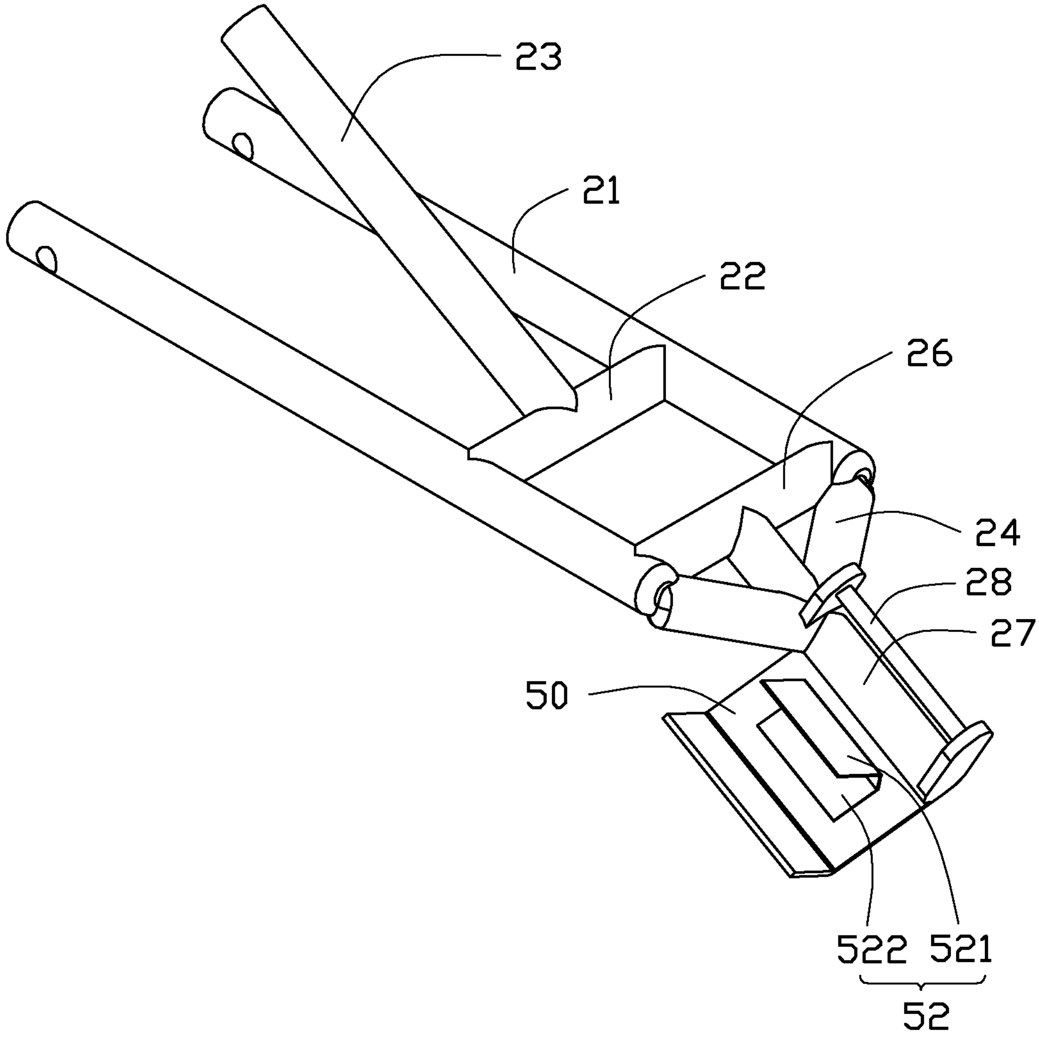
FIG. 4 is an assembled, inverted view of a bracket and cover of the lamp of FIG. 1.
Figure 5:
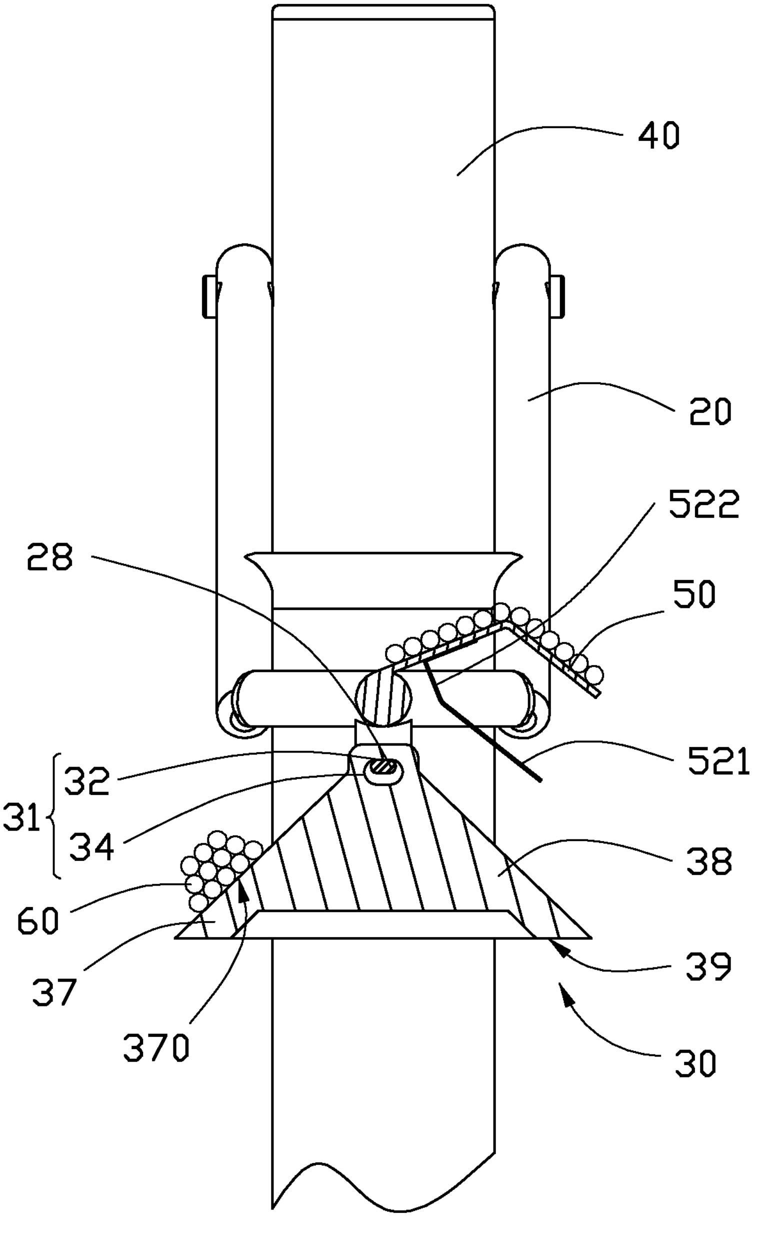
FIG. 5 is a cross-sectional view of the lamp of FIG. 3, taken along line V-V of FIG. 1, with snow/ice accumulated on a top of a lamp body thereof.
Figure 6:
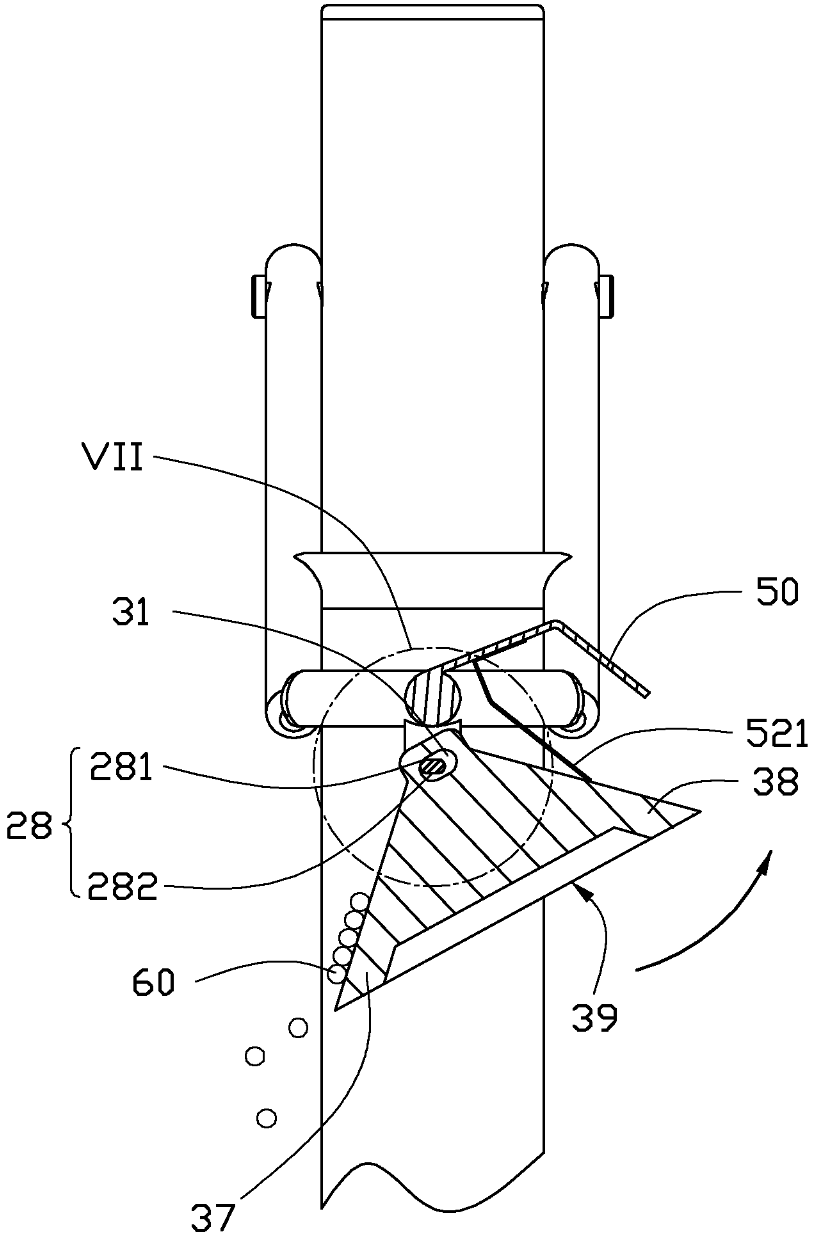
FIG. 6 is a view similar to FIG. 5, wherein the lamp body rotates to another position different from that of FIG. 5 and some of the snow accumulated on the top of the lamp body leaves therefrom.

Referring also to FIGS. 4-6, the top end of the bracket 20 is firmly fixed to the lamp post 40 via a fastener 70, and the bottom end thereof is pivotably connected with the lamp body 30. The bracket 20 comprises two main beams 21, a middle beam 22, a connecting beam 24 and a supporting beam 23. The main beams 21 extend slantways downwardly from the lamp post 40. The middle beam 22 perpendicularly connects with middle portions of the main beams 21, and the connecting beam 24 perpendicularly connects with bottom ends of the main beams 21. The supporting beam 23 connects the middle beam 22 and the lamp post 40 to enhance the rigidity of the bracket 20. The bracket 20 further comprises an extending beam 27 extending from a middle portion of the connecting beam 24. The extending beam 27 extends horizontally and outwardly from the connecting beam 24. Two strengthening beams 26 connect the bottom ends of the main beams 21 and the extending beam 27. The bracket 20 further comprises a horizontal shaft 28 fixed below the extending beam 27 to pivotably connect with the lamp body 30. In this embodiment, the shaft 28 has a flat top surface 281 and two arced lateral surfaces 282 continuously and smoothly extending downwardly from two sides of the flat top surface 281. The shaft 28 has an elliptical cross section, as viewed from FIG. 5. A width of the shaft 28 along a horizontal direction is larger than a thickness of the shaft 28 along a vertical direction.

The cover 50 extends integrally and laterally from a top of the extending beam 27 of the bracket 20 and located above a lateral portion of the lamp body 30. The cover 50 is inverted V-shaped. An elastic member is fixed at a bottom surface of the cover 50. In this embodiment, the elastic member is a leaf spring 52. The leaf spring 52 is approximately U-shaped and made of metal. The leaf spring 52 is located above the lamp body 30 and extends downwardly toward to the lamp body 30. The leaf spring 52 comprises a mounting portion 522 and an elastic portion 521. The mounting portion 522 is soldered to the bottom surface of the cover 50, and the elastic portion 521 is extended downwardly from the mounting portion 522 to the lamp body 30.

The lamp body 30 has a triangular cross section and defines a channel 31 at a top thereof to pivotably receive the shaft 28. The lamp body 30 is symmetrical with respect to a central, vertical plane (not shown) which is defined through the channel 31. The lamp body 30 has a first lateral portion 37 and a second lateral portion 38 symmetrical with respect to the vertical plane. The cover 50 is mounted above the second lateral portion 38. In this embodiment, the lamp body 30 includes a light source such as an LED light source therein and a bottom surface 39 used as a light emitting surface. The channel 31 defines an elliptical cross section larger than the cross section of the shaft 28. A width of the channel 31 along the horizontal direction is larger than a thickness of the channel 31 along the vertical direction. In this embodiment, the thickness of the channel 31 is less than the width of the shaft 28. The channel 31 has a flat top surface 32 and two arced lateral surfaces 34 continuously and smoothly extending from two lateral sides of the top surface 32, respectively.

The lamp body 30 is pivotably connected with a free end of the bracket 20 via the shaft 28 extending in the channel 31. The flat top surface 281 of the shaft 28 flatly engages the top surface 32 in the channel 31. Thus, the bottom surface 39 of the lamp body 30 is held in a substantially horizontal position thereby to facilitate lighting the ground.

Figure 7:
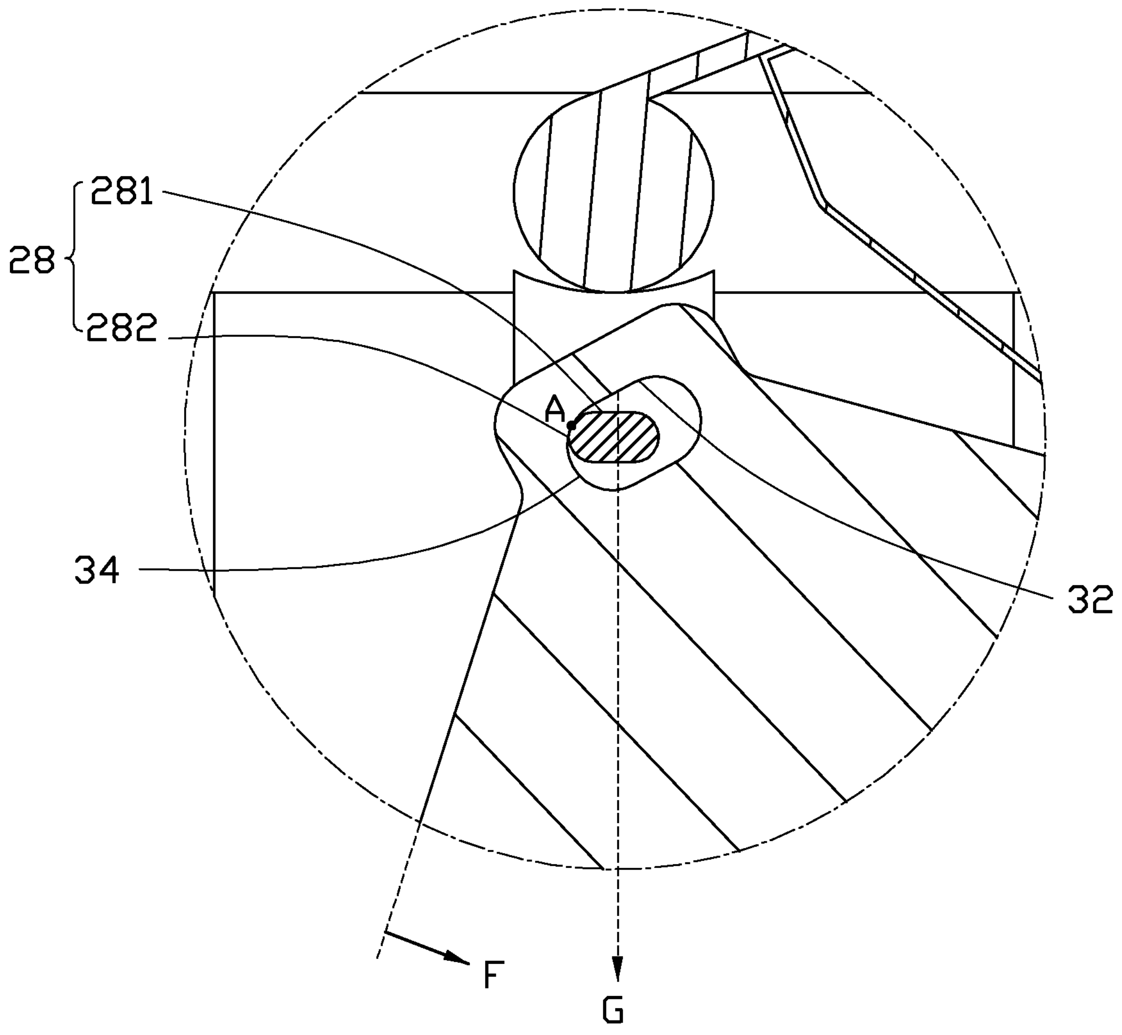
FIG. 7 is an enlarged view of a circled portion VII of FIG. 6.

Referring also to FIG. 7, in a snow/snowstorm day, snow 60 falls and accumulates on the cover 50 and a top surface 370 of the of the first lateral portion 37 of the lamp body 30. The snow 60 accumulated on the top surface 370 provides a weight on the first lateral portion 37. When the snow 60 gradually accumulates more and more on first lateral portion 37 and the weight of the snow 60 reaches a critical (threshold) value, a moment generated by a component F of the weight of the snow 60 to a point A is larger than a moment of a weight G of the lamp body 30 to the point A; thus, the component F of the weight of the snow 60 drives lamp body 30 to rotate around the shaft 28 counterclockwise as viewed from FIGS. 6 and 7 to cause the first lateral portion 37 to be steeper than its original orientation; in other word, the lamp body 30 rotates around the shaft 28 counterclockwise toward the cover 50. The top surface 370 of the first lateral portion 37 rotates from a slantwise position to a substantially vertically portion. The snow 60 accumulated on the first lateral portion 37 is moved to be in a vertically portion accordingly. In another embodiment, the top surface 370 of the first lateral portion 37 can be defined substantially horizontal, whereby the top surface 370 rotates from a substantially horizontal position to a slantwise position. In the present embodiment, simultaneously, the second lateral portion 38 rotates upwardly around the shaft 28 and collides the elastic portion 521 of the leaf spring 52; thus, the cover 50 vibrates by the collision of the second lateral portion 38 to make the snow 60 on the cover 50 leave from the cover 50 and fall onto the ground. Meanwhile, the snow 60 on the top surface 370 of the first lateral portion 37 slides away from the top surface 370 and falls onto the ground by the weight thereof, as viewed from FIG. 6. Therefore, the snow 60 on the cover 50 and the lamp body 30 is mostly removed therefrom by the rotation of the lamp body 30 around the shaft 28. Since the snow 60 becomes little and the weight of the snow 60 reduces to be less than the critical value, then, the weight G of the lamp body 30 drives the lamp body 30 to rotate around the shaft 28 clockwise to return to its original position. The flat top surface 281 of the shaft 28 flatly engages the top surface 32 of the lamp body 30 again. The lamp body 30 resumes in a substantially horizontal position. In this embodiment, the leaf spring 52 helps the lamp body 30 to return quickly via an elasticity thereof. When the snow 60 on the first lateral portion accumulates to the predetermined amount again, the lamp body 30 rotates again to enable the snow 60 accumulated on the top surface 370 to leave therefrom and fall onto the ground.

In this embodiment, the shaft 28 is perpendicular to the connecting beam 24, and is accordingly perpendicular to an extending direction of a road at which the lamp 10 is installed. When the lamp body 30 is rotated to the vertical position to enable the snow 60 to leave therefrom, a power supply of the lamp body 30 is controlled to be off by a controlling circuit (not shown) to avoid illuminating the ground along the road extending direction for road safety consideration. In other embodiment, the shaft 28 can be set parallel to the connecting beam 24; therefore, the lamp body 30 can rotate around the shaft 28 at a plane perpendicularly to the road extending direction to be close to the lamp post 40 or away from the lamp post 40.

It is to be understood, however, that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lamp, comprising:

a bracket comprising a shaft, the shaft having a flat top surface;

a lamp body pivotably engaged with the shaft of the bracket, the lamp body comprising a first lateral portion at a side of the shaft and a second lateral portion at an opposite side of the shaft, the lamp body defining a channel to receive the shaft, the lamp body having a flat top surface in the channel; and a cover mounted on a top of the second lateral portion;

wherein when the lamp body is at a first position, the top surface in the channel of the lamp body engages on the top surface of the shaft, and when the first lateral portion of the lamp body is subjected to an exterior force acting thereon which is beyond a set value, the lamp body rotates around the shaft from the first position to a second position in which the top surface of the channel leaves from the top surface of the shaft, and when the exterior force disappears or decreases to be less than the set value, the lamp body returns from the second position to the first position, the exterior force being exerted on the first lateral portion by weight of snow/ice accumulated on the first lateral portion.

2. The lamp as claimed in claim 1, wherein the shaft has at least an arced lateral surface extending continuously and smoothly from the flat top surface of the shaft, and the channel has at least an arced lateral surface extending continuously and smoothly from the top surface of the channel, the arced lateral surface of the channel engaging the lateral surface of the shaft when the lamp body is at the second position.

3. The lamp as claimed in claim 1, wherein the shaft has an elliptical cross section, a width of the shaft along a horizontal direction is larger than a thickness of the shaft along a vertical direction.

4. The lamp as claimed in claim 3, wherein the shaft has an elliptical cross section, a width of the shaft along the horizontal direction is larger than a thickness of the shaft along a vertical direction.

5. The lamp as claimed in claim 4, wherein the thickness of the channel is less than the width of the shaft.

6. The lamp as claimed in claim 1, wherein the bracket further comprises an elastic member to exert a spring force at the second lateral portion of the lamp body when the lamp body is at the second position.

7. The lamp as claimed in claim 6, wherein the elastic member is a leaf spring comprising a mounting portion and an elastic portion to resist the second lateral portion, and the leaf spring is U-shaped and made of metal.

8. The lamp as claimed in claim 1, wherein the bracket comprises two parallel main beams, a middle beam connecting with the main beams, and a connecting beam connects with bottom ends of the main beams, the shaft engaging with the connecting beam.

9. The lamp as claimed in claim 8, wherein the shaft is perpendicular to the connecting beam.

10. The lamp as claimed in claim 8, wherein shaft is parallel to the connecting beam.

11. The lamp as claimed in claim 8, wherein the lamp body is symmetrical with respect to the channel.

* * * * *